United States Patent [19]

Nikirk et al.

[11] Patent Number: 5,511,797
[45] Date of Patent: Apr. 30, 1996

[54] TANDEM SEAL GASKET ASSEMBLY

[75] Inventors: Chris T. Nikirk; Francis L. Seidel, both of Houston, Tex.

[73] Assignee: Furon Company, Laguna Niguel, Calif.

[21] Appl. No.: 98,642

[22] Filed: Jul. 28, 1993

[51] Int. Cl.$^6$ .................................................. F16J 15/00
[52] U.S. Cl. ................... 277/204; 277/207 A; 277/229; 277/235 A
[58] Field of Search ..................... 277/207 R, 207 A, 277/211, 229, 235 A, 204, 209, 210, 227; 285/910, 917

[56] References Cited

U.S. PATENT DOCUMENTS

| | | |
|---|---|---|
| 2,357,257 | 8/1944 | Goetze . |
| 2,580,546 | 1/1952 | Hobson, Jr. . |
| 2,597,976 | 5/1952 | Cousins . |
| 2,828,987 | 4/1958 | Schmitz . |
| 3,117,795 | 1/1964 | Price . |
| 3,542,382 | 11/1970 | Hagmann . |
| 3,815,927 | 6/1974 | Geipel . |
| 3,841,289 | 10/1974 | Meyers . |
| 3,843,141 | 10/1974 | Kuhn .......................................... 277/209 |
| 4,364,982 | 12/1982 | Gee . |
| 4,397,472 | 8/1983 | Czernik . |
| 4,784,411 | 11/1988 | Tuckmantel .............................. 285/910 |
| 5,076,592 | 12/1991 | Pearlstein . |
| 5,161,807 | 11/1992 | Allen et al. . |
| 5,195,759 | 3/1993 | Nicholson ................................ 277/229 |

*Primary Examiner*—Daniel G. DePumpo
*Attorney, Agent, or Firm*—Fay, Sharpe, Beall, Fagan, Minnich & Mckee

[57] ABSTRACT

A tandem seal gasket assembly is provided that has a first seal that is compatible with highly corrosive process media or in applications where high purity is required. A radially outer seal is intended to address heat resistant or elevated temperature requirements. In a first preferred arrangement, a PTFE envelope is provided over a profiled metal base ring, the second seal defined by a spiral wound gasket, and an outer guide ring used to limit compression and add radial strength to the assembly. According to a second preferred arrangement, the annular dimension of the metal base ring is increased to cooperate with the PTFE envelope and define the first, radially inner seal. The profiled face of the metal base ring is extended and operatively receives graphite layers to define the second, fire resistant seal. A radially outer portion of the metal base ring extends from the profiled configuration and defines an integral guide ring.

16 Claims, 4 Drawing Sheets

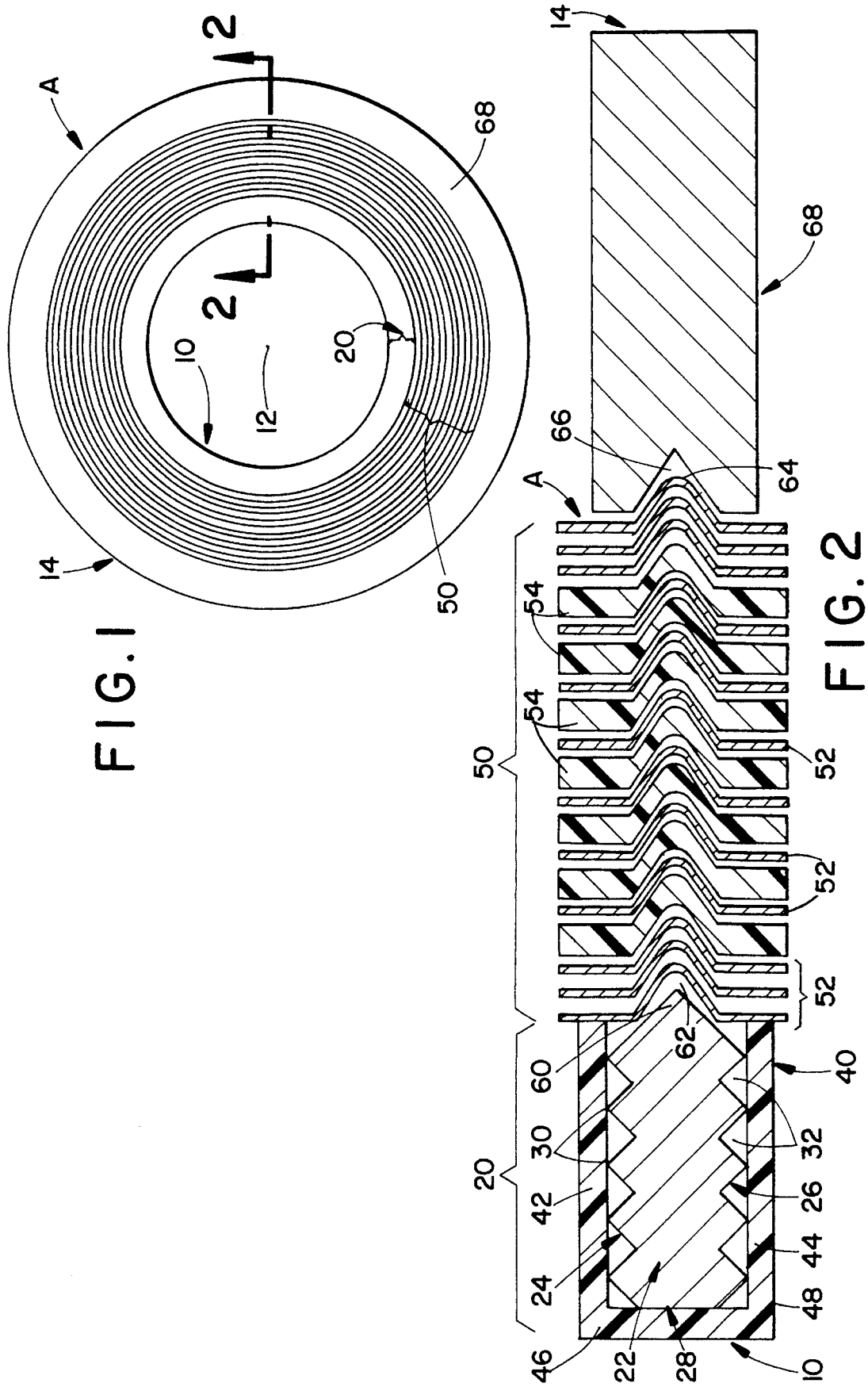

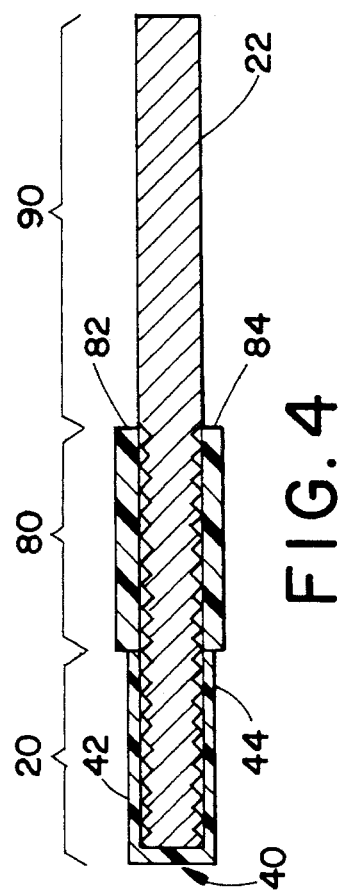
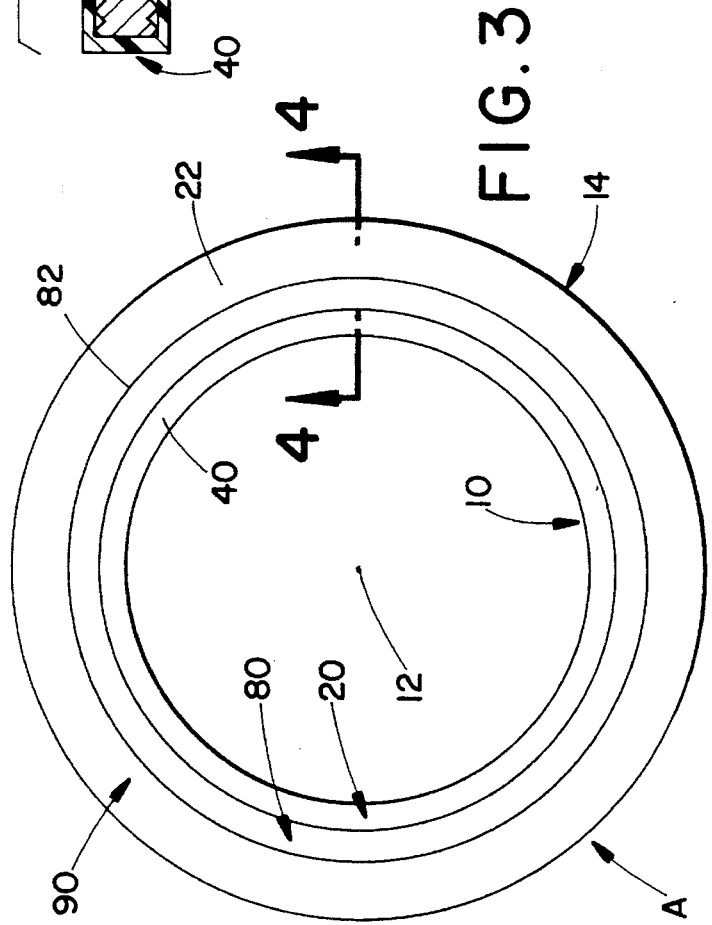
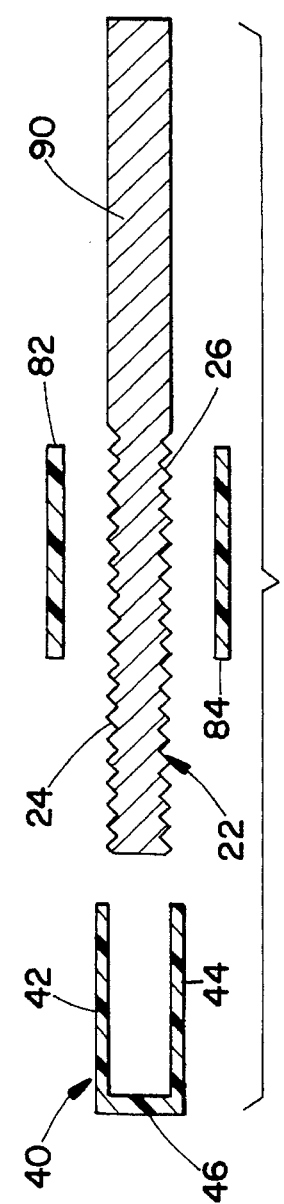

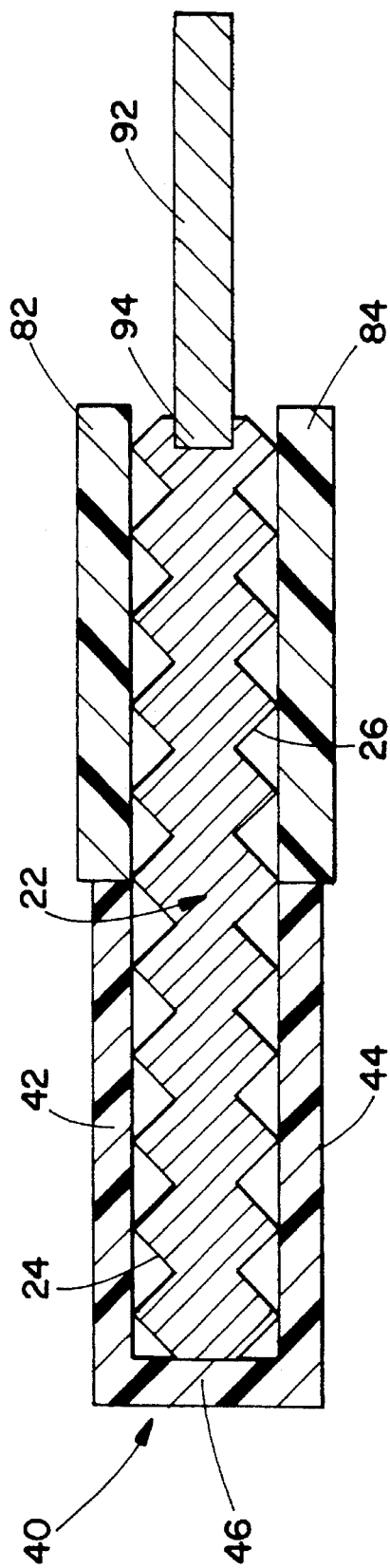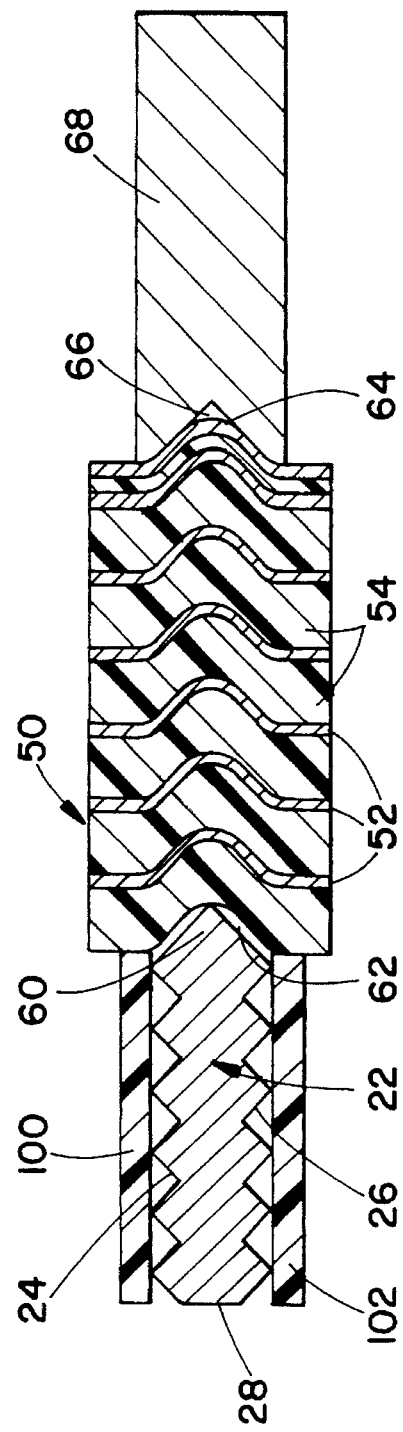

TANDEM SEAL GASKET ASSEMBLY

BACKGROUND OF THE INVENTION

This invention relates to sealing gaskets and more particularly to a tandem seal arrangement intended to address multiple problems associated with highly corrosive process media or high purity requirements, and situations requiring heat resistant characteristics. The invention finds particular applicability in annular gasket arrangements that are disposed between pipe flanges provided at opposite ends of pipe sections. The pipes or fluid lines are often used in the petroleum, petrochemical, nuclear, and other related industries, although the subject invention may be useful in other environments and applications.

Spiral wound gaskets are well known in the industry. Typically, a spiral wound gasket includes a metal strip between which strips of a sealing material are interspersed as the strip is wound upon itself forming an annulus about a central axis. By way of example only, a number of different metals can be used for the metallic winding such as stainless steel, monel, nickel, titanium, or carbon steel. Each material provides its own particular characteristics to meet desired specifications. Likewise, various filler materials can be used. Typically, the filler material employed is a softer strip of material that is deformed when compressed between the pipe flanges providing desired sealing characteristics.

As indicated above, spiral wound gaskets are normally disposed between opposed flanges of mating pipe ends. The pipe flanges are clamped together by means of circumferentially spaced bolts or any other suitable fastening arrangement. In selected situations, radially inner and/or outer guide rings may be used in conjunction with the spiral wound gasket. The guide rings are usually formed from carbon steel and serve a number of different functions in the gasket assembly. A primary function of the outer guide ring is to act as a compression limiter. Additionally, the outer guide ring provides increased radial strength to the gasket assembly. Moreover, the outer guide ring facilitates installation, in addition to providing a positive centering of the gasket on the pipe flange. The inner ring protects against distortion of the gasket, limits erosion of the pipe and flange faces, and also protects the gasket from adverse effects associated with excessive turbulence.

A particular need in various industries exists for a gasket or seal assembly that serves dual purposes. A fluid system may have two primary functions that need to be addressed. For example, highly corrosive process media oftentimes attack gasket materials thereby requiring more frequent maintenance and/or replacement. Likewise, other applications require high purity thus precluding use of less expensive gasket filler materials that might contaminate the process media.

Still another primary goal is to provide a radially outer seal that is heat resistant. The heat resistant seal is intended to maintain seal integrity for a predetermined time period if the gasket assembly is exposed to elevated temperatures associated with extreme heat or fire. Oftentimes, the radially inner seal that is intended to address the high purity or high corrosive problems results in use of a seal material that is particularly sensitive to elevated temperatures. Thus, the outer seal is designed to act as a seal if exposure to elevated temperatures occurs.

SUMMARY OF THE INVENTION

The present invention contemplates a new and improved gasket assembly that provides a tandem seal arrangement intended to address different, distinct needs for a fluid system.

More particularly, the present invention provides a gasket assembly that includes a metal ring having first and second faces with a profiled configuration. A plastic envelope is received over portions of these profiled faces for sealing against highly corrosive process media or where high purity is required. A heat resistant seal is disposed radially outward of the plastic envelope for maintaining seal integrity during elevated temperatures.

According to another aspect of the invention, the inner radial seal that protects against corrosive process media or does not effect high purity media is a spiral wound seal. This inner, spiral wound seal has intermittent layers of strip metal and a chemically resistant material.

According to a more limited aspect of the invention, the heat resistant seal is a spiral wound seal that has intermittent layers of strip metal and heat resistant packing material.

According to another aspect of the invention, the heat resistant seal comprises a heat-resistant material received over radially extended, outer portions of the profiled faces of the metal ring.

According to still another aspect of the invention, a guide ring is disposed radially outward of the heat resistant seal for centering and limiting compression of the gasket assembly. Likewise, an inner radial ring may be used in the assembly for reinforcement and to provide protection against pipe flange face erosion.

A principal advantage of the invention resides in a tandem seal that can meet different requirements of a fluid system.

Another advantage of the invention resides in a simplified structure that achieves equivalent or better results than known arrangements.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein:

FIG. 1 is a top plan view of a preferred tandem seal gasket assembly;

FIG. 2 is a cross-sectional view taken generally along the lines 2—2 of FIG. 1;

FIG. 3 is a top plan view of a second preferred tandem seal gasket assembly;

FIG. 4 is a cross-sectional view taken generally along the lines 4—4 of FIG. 3;

FIG. 5 is an exploded, cross-sectional view of the components illustrated in FIG. 4;

FIG. 6 is a cross-sectional view similar to FIG. 4 of a third preferred tandem seal gasket assembly;

FIG. 7 is a cross-sectional view of a fourth preferred embodiment of the tandem seal assembly;

DETAILED DESCRIPTION OF THE PREFERRED EMBODIMENTS

Figure 8:
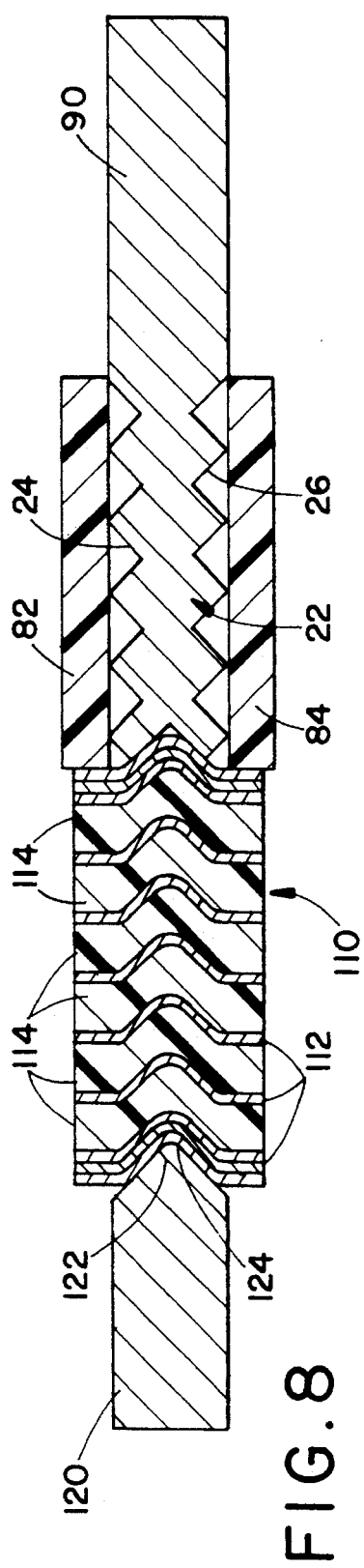
FIG. 8 is a cross-sectional view of a fifth preferred embodiment.

Referring now to the drawings wherein the showings are for purposes of illustrating the preferred embodiments of the invention only and not for purposes of limiting same, the FIGURES show a tandem seal gasket assembly A adapted for receipt between opposed flanges on mating pipe ends (not shown). More particularly, and with reference to FIGS. 1 and 2, a first preferred embodiment of the gasket assembly A is illustrated. The gasket assembly is an annular configuration having an inner radial periphery be concentric about a longitudinal axis 12 and an outer radial periphery 14, also concentric about the longitudinal axis. Although not illustrated, it is understood in the art that the axis 12 is generally aligned with the longitudinal axes of the pipes (not shown). Mating pipe ends usually include radially outward extending flanges that are perpendicular to the longitudinal axis 12. In this manner, the gasket assembly A is longitudinally located between opposed flanges of the mating pipe ends, the flanges clamped together, and an effective seal formed by the gasket assembly to preclude fluid flow radially outward from the inner periphery of the gasket assembly and along the flanges at the pipe joint.

In the particular embodiment of tandem seal gasket assembly A shown in FIGS. 1 and 2, a first or radially inner seal 20 is particularly intended for use in environments having a highly corrosive process media or where high purity is required. Highly corrosive fluids, as expected, often attack seal materials that comprise the gasket assembly. On the other hand, in high purity environments, one must be particularly attentive to the types of sealing materials used in the gasket assembly so that the seal materials themselves do not contaminate the fluid carried in the pipe or fluid system. For these types of applications, the first seal 20 may be comprised of a metal base ring 32 having opposed first and second faces 24, 26. The first and second faces are interconnected along an inner radial edge 28. As shown, preferably the first and second faces each have a profiled configuration defined by a series of radially spaced ridges 30 with intermittent valleys 32. Each of the ridges and valleys has a V-shaped profile to maximize sealing capabilities.

Enclosing the metal base ring 22 along the first and second faces 24, 26 and the interconnecting edge 28 is an envelope 40. Preferably, the envelope is formed of a material that maintains its integrity when exposed to highly corrosive fluids or that will not contaminate a fluid where high purity is required. One preferred material that meets these qualifications is polytetrafluouroethylene (PTFE). Other suitable plastic or elastomeric materials can be used with success, although system requirements may dictate one material over another under selected circumstances. As shown, the envelope 40 is C-shaped in cross section. Elongated legs 42, 44 cover the faces 24, 26 of the base ring and a third or interconnecting leg 46 covers the radial inner edge 28 of the base ring. Preferably, the envelope has smooth, planar surfaces 48 that provide an effective seal when clamped between the pipe flanges, and do not provide any pockets or openings in which fluid or other contaminant may be deposited or retained.

The second seal 50 is a spiral wound gasket defined by first layers of strip metal 52 cooperating with intermittent filler material 54. Typically, multiple layers of strip metal are provided along radially inner and outer peripheries of the second seal for strength purposes while an intermediate region of the second seal incorporates the filler material 54 spaced between adjacent windings of the strip metal. As indicated above, according to the preferred arrangement, the filler material has heat resistant characteristics. For example, a graphite-based material can be used as a preferred filler material because of its heat resistant characteristics and properties. Still other heat-resistant materials may be used in selected circumstances.

A central portion of the second seal is radially displaced relative to the remainder of the seal. This provides a tongue and groove arrangement that lends strength and locating characteristics to the assembly. For example, the radially outer edge of the base ring in the first seal 20 may include a protrusion 60 received in a corresponding groove 62 of the inner radial portion of the second seal. Likewise, an outer radial portion of the second seal has a central protrusion 64 that assists in locating the second seal relative to a groove 66 in a guide ring 68. The guide ring is usually a carbon steel, although other materials may be used without departing from the scope and intent of the invention. The guide ring acts as a compression limiter while simultaneously increasing the radial strength of the gasket assembly. The guide ring also aids in installing the assembly and provides a positive centering of the gasket assembly between opposed flanges. Thus, the radial dimension of the guide ring may vary as required.

Turning now to the second preferred embodiment of FIGS. 3–5, like numerals will be used to describe like elements, while new numerals will be used to refer to new components. The gasket assembly of FIGS. 3–5 is also a tandem seal arrangement that has a metal base ring 22 with opposed profiled faces 24, 26. An envelope 40 preferably formed of PTFE extends radially over only a portion of the profiled base ring to define the first or inner radial seal 20. The inner seal is structurally and functionally identical to the inner seal described above with respect to the embodiment of FIGS. 1–3.

The second or outer radial seal 80 is of modified construction in the second preferred embodiment. As best illustrated in FIGS. 4 and 5, the metal base ring extends radially outward, i.e., has a greater annular dimension, so that the profiled first and second faces 24, 26 extend into the second seal region. A heat resistant material, preferably a flexible graphite, is provided by first and second face seals or layers 82, 84. The flexible graphite has planar inner and outer faces 86, 88, and extends radially from terminal ends of the envelope legs 42, 44 to the outer radial edge of the profiled faces 24, 26. In other words, the outer radial portion of the profiled faces 24, 26 in conjunction with the graphite layers 82, 84 define the second seal that is intended to address the requirement for a seal effective in elevated temperatures.

The metal base ring continues radially outward from the second seal region, in effect forming an integral guide ring 90 along its outer radial edge. As will be understood by those skilled in the art, use of a metal base ring that is enclosed by a first material (PTFE) along an inner portion, a second material (flexible graphite) along an intermediate region, and then is non-profiled along the outer radial portion limits the number of components used in forming the gasket assembly while still addressing desired operative characteristics.

Turning now to the third preferred embodiment shown in FIG. 6, it has many similarities to the arrangement of FIGS. 3–5 so that like numerals will refer to like elements while new numerals refer to new elements. This arrangement also provides for a tandem seal by incorporating a PTFE envelope 40 in which the envelope legs 42, 44 cooperate with opposite faces of the inner radial portion of the profiled ring 22. Likewise, a heat-resistant material is defined by first and second face seals 82, 84 at an area radially outward from the inner seal. The primary area of distinction is that in the FIGS. 3–5 embodiment, the metal base ring continues radially outward from the second seal region to define an integral guide ring 90. Here, a non-integral guide ring 92 extends radially outward from the second seal. That is, outer guide 92 is a separate element from the metal base ring 22. Preferably, a tongue and groove arrangement 94 interconnects the guide ring 92 to the metal base ring 22. In substantially all other respects, the FIG. 6 embodiment is structurally and functionally similar to that of the FIGS. 3–5 embodiment.

FIG. 7 illustrates yet another preferred embodiment. Again, a metal base ring 22 has opposed profiled faces 24, 26. Chemical resistance is provided by a pair of face seals 100, 102. PTFE, as described above, is one preferred material of construction for the face seal. The metal ring has a limited radial dimension, its inner periphery 28 terminating with the radial inner edges of the face seals 100, 102. The outer periphery of the metal ring has a protrusion 60 received in a corresponding groove 62 of the central portion of the second seal. As apparent, the second seal is a spiral wound gasket structure 50 defined by alternating metal strips 52 that cooperate with an intermittent filler material 54. A groove 62 is provided along the inner periphery to receive the protrusion 60 while the outer periphery has a central protrusion 64 received in groove 66 of the guide ring. It will be understood that in selected situations, the compression guide ring is not required and the inner and outer seals would function in substantially the same manner.

Figure 9:
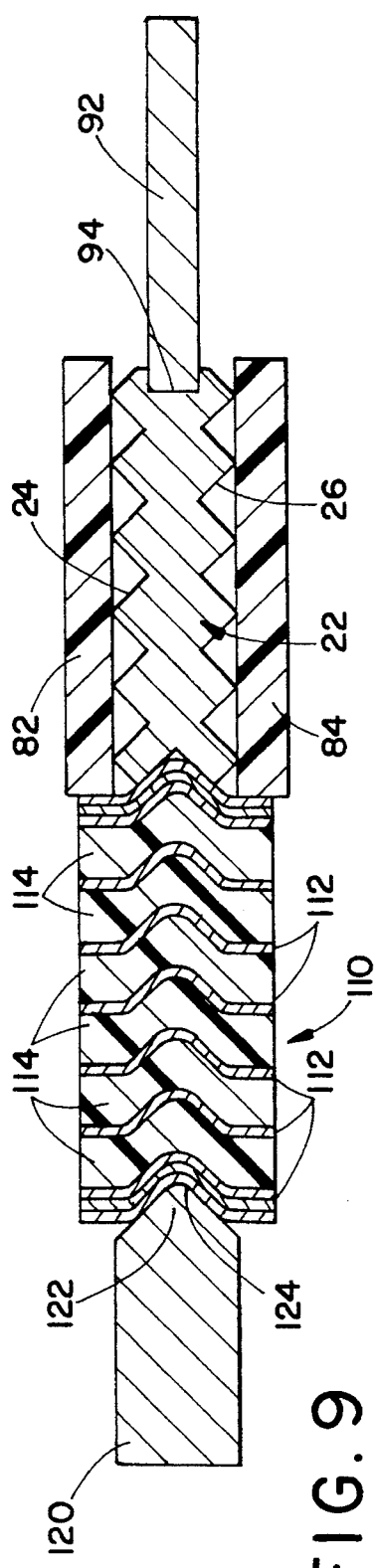
FIG. 9 is a cross-sectional view of a sixth preferred tandem seal gasket assembly; and, FIG. 10 is a cross-sectional view of a seventh preferred tandem seal gasket assembly.
Figure 10:
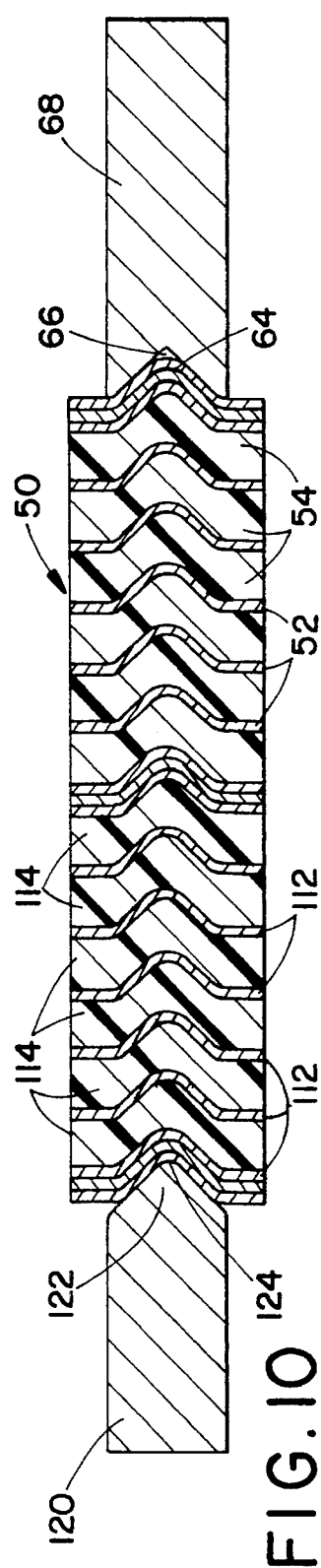

The embodiments of FIGS. 8–10 are all related by the fact that the first or inner seal is defined by a spiral wound gasket that is chemically resistant to address the high purity and highly corrosive requirements for selected fluid systems. Therefore, the inner seal 110 is comprised of intermittent layers of strip metal 112 and a filler material 114. The filler material is preferably PTFE. Alternatively, a filled PTFE, which is a mixture of PTFE and other materials, can be used. Still other filler materials that satisfy the high purity and chemical resistance requirements of the fluid system can be used with equal success.

The second or radially outer seal includes the metal base ring 22 that has profiled faces 24, 26 along an inner portion thereof, as well as an extension that forms an integral guide ring 90. The profiled faces are covered by face seals 82, 84, typically a flexible graphite or other heat-resistant material.

Moreover, this embodiment has an inner guide ring 120 that protects against distortion of the inner windings of the spiral wound inner seal while simultaneously protecting against flange face erosion of the pipes and protecting against excessive turbulence. The inner guide ring is also preferably formed from a carbon steel, although other similar materials may be used. Moreover, it includes a protrusion 122 received in a central, radially displaced portion 124 of the spiral wound inner seal.

As shown in FIG. 9, the embodiment of FIG. 8 is slightly modified to illustrate that the outer guide ring need not be integrally formed with the metal base ring. Instead, a separate outer guide ring 92 is received in groove 94 of the outer periphery of the metal base ring. In substantially all other respects, the FIG. 9 embodiment is identical to that described above with respect to FIG. 8.

FIG. 10, on the other hand, illustrates still another modification in which the inner guide ring 120 cooperates with a spiral wound arrangement defining the inner radial seal. Details of that arrangement have already been described with respect to FIG. 8. The second or outer radial seal is also a spiral wound seal incorporating alternating layers of strip metal and filler material. It is preferred that the filler material have heat-resistant properties such as provided by a graphite material. Likewise, a guide ring 90 can be incorporated into the assembly if so desired and an inner guide ring 120 also used in selected circumstances.

Although a number of preferred configurations for the tandem seal arrangement have been described, the following is a list of preferred materials that may be used for the sealing element or filler:

PTFE

"Filled" PTFE

Graphite

Graphite/Rubber Mixture

Rubber Compounds

Ceramic Fibers/Cloth

Polypropylene

Various materials that may be used for the wire strip, profiled ring, or the guide ring include:

Carbon Steel

Stainless Steel

Hastelloy

Incoloy

Inconel

Monel

Nickel

20-Cb-3

Titanium

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A gasket assembly comprising:

a metal ring having opposed first and second faces interconnected along an inner periphery, at least one of the faces having a profiled configuration defined by concentric ridges radially spaced apart by depressions;

a plastic envelope received over at least a portion of the metal ring faces for sealing against highly corrosive process media or where high purity is required; and a fire resistant seal disposed radially adjacent the plastic envelope for maintaining seal integrity in response to elevated temperatures, the fire resistant seal being a spiral wound seal including layers of strip metal and fire resistant packing material.

2. The gasket assembly as defined in claim 1 wherein the spiral wound seal has a tongue and groove profile.

3. The gasket assembly as defined in claim 2 wherein the tongue and groove profile is centrally disposed in the spiral wound seal.

4. The gasket assembly as defined in claim 2 wherein the metal ring has an outer peripheral protrusion received in an inner peripheral portion of the tongue and groove profile of the spiral wound seal.

5. The gasket assembly as defined in claim 4 further comprising a guide ring disposed radially outward of the spiral wound seal for centering and limiting compression of the gasket assembly, the guide ring having a groove for receiving an outer peripheral portion of the tongue and groove profile of the spiral wound seal.

6. The gasket assembly as defined in claim 1 further comprising a guide ring disposed radially outward of the spiral wound seal for centering and limiting compression of the gasket assembly.

7. The gasket assembly as defined in claim 1 further comprising a guide ring disposed radially outward of the spiral wound seal for centering and limiting compression of the gasket assembly.

8. The gasket assembly as defined in claim 1 wherein the fire resistant seal includes a graphite based material.

9. The gasket assembly as defined in claim 1 wherein the fire resistant seal is received over a radially outer portion of the profiled configuration.

10. A gasket assembly comprising:
   a metal ring having opposed first and second faces, the faces having a profiled configuration defined by alternating ridges and depressions;
   a plastic envelope received over and covering the first and second faces of the metal ring, the plastic envelope having substantially smooth, planar first and second faces facing outwardly from the metal ring; and,
   a spiral wound seal disposed radially outward of the metal ring and including layers of strip metal and fire resistant packing material, the spiral wound seal having a tongue and groove profile.

11. The gasket assembly as defined in claim 10 further comprising a guide ring disposed radially outward of the spiral wound seal.

12. The gasket assembly as defined in claim 11 wherein the guide ring has a groove along its inner periphery for receiving a central portion of the spiral wound seal therein.

13. The gasket assembly as defined in claim 10 wherein the metal ring has a generally V-shaped outer periphery for receipt in the tongue profile of an inner periphery of the spiral wound seal.

14. The gasket assembly as defined in claim 13 wherein the metal ring has a substantially planar inner periphery that abuts against an axially extending portion of the plastic envelope.

15. The gasket assembly as defined in claim 10 wherein the plastic envelope is generally C-shaped in cross-sectional configuration and encloses an inner periphery of the metal ring.

16. A gasket assembly comprising:
   a metal ring having opposed first and second faces interconnected along an inner periphery, the faces having a profiled configuration defined by concentric ridges radially spaced apart by depressions;
   a plastic envelope received over at least a portion of the metal ring faces for sealing against highly corrosive process media or where high purity is required;
   a fire resistant seal disposed radially adjacent the plastic envelope for maintaining seal integrity in response to elevated temperatures; and
   a guide ring disposed radially outward of the spiral wound seal for centering and limiting compression of the gasket assembly, the guide ring having a groove for receiving an outer peripheral portion of the tongue and groove profile of the spiral wound seal.

* * * * *